United States Patent
Okada et al.

(10) Patent No.: US 7,658,086 B2
(45) Date of Patent: Feb. 9, 2010

(54) DRAWING METHOD FOR BARE OPTICAL FIBER WITH SUPPRESSED HYDROGEN DIFFUSION

(75) Inventors: Kenji Okada, Yotsukaido (JP); Koichi Harada, Yachiyo (JP); Shunichirou Hirafune, Sakura (JP); Munehisa Fujimaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/433,576

(22) Filed: May 15, 2006

(65) Prior Publication Data

US 2006/0204193 A1    Sep. 14, 2006

(51) Int. Cl.
  C03B 37/023    (2006.01)
(52) U.S. Cl. ............... 65/377; 65/384; 65/426
(58) Field of Classification Search ............ 65/384, 65/377, 426
  See application file for complete search history.

(56) References Cited

U.S. PATENT DOCUMENTS

| | | | | |
|---|---|---|---|---|
| 4,157,906 A | * | 6/1979 | Bailey | 65/422 |
| 4,659,355 A | * | 4/1987 | Maze et al. | 65/388 |
| 4,673,427 A | * | 6/1987 | Van Der Giessen et al. | 65/424 |
| 5,059,229 A | * | 10/1991 | Blankenship et al. | 65/424 |
| 5,256,178 A | * | 10/1993 | Schneider et al. | 65/388 |
| 5,284,499 A | * | 2/1994 | Harvey et al. | 65/435 |
| 5,294,240 A | * | 3/1994 | Sanghera et al. | 65/388 |
| 5,314,519 A | * | 5/1994 | Petisce | 65/425 |
| 5,320,658 A | * | 6/1994 | Ohga et al. | 65/435 |
| 5,545,246 A | * | 8/1996 | Lysson et al. | 65/435 |
| 5,568,728 A | * | 10/1996 | Sapsford | 62/63 |
| 5,897,681 A | * | 4/1999 | Lysson et al. | 65/435 |
| 6,010,741 A | * | 1/2000 | Rosenkranz et al. | 427/9 |
| 6,131,415 A | | 10/2000 | Chang et al. | |
| 6,928,840 B1 | * | 8/2005 | Nagayama et al. | 65/424 |
| 2002/0194881 A1 | * | 12/2002 | Nagayama et al. | 65/424 |
| 2003/0110811 A1 | | 6/2003 | Nunome et al. | |
| 2003/0126890 A1 | | 7/2003 | Orita et al. | |

FOREIGN PATENT DOCUMENTS

EP    0 899 243 A1    3/1999

(Continued)

OTHER PUBLICATIONS

T. Moriyama, et al.: "Ultimately Low OH Content V.A.D Optical Fibres"; Electronic Letters; vol. 16, No. 18; Aug. 28, 1980; pp. 698-699.

(Continued)

*Primary Examiner*—John Hoffmann
(74) *Attorney, Agent, or Firm*—Sughrue Mion, PLLC (57) ABSTRACT

A drawing method for a bare optical fiber, comprises the steps of: melting an optical fiber preform using a heating device and drawing the bare optical fiber; and naturally cooling down the bare optical fiber or forcibly cooling down the bare optical fiber by a cooling device after the heating and melting step, wherein a temperature history during the drawing the optical fiber preform to obtain the bare optical fiber in the heating device satisfies a relational expression: $T \leq -0.01X+12$ where a time period when the heated and molten portion of the optical fiber preform heated and molten by the heating device reaches 1800° C. or higher is T (min) and a OH group concentration in a cladding layer of the optical fiber preform is X (wtppm).

8 Claims, 6 Drawing Sheets

FOREIGN PATENT DOCUMENTS

| | | | |
|---|---|---|---|
| EP | 1 205 449 | A1 | 5/2002 |
| JP | 2549615 | B2 | 8/1996 |
| JP | 11-60287 | | 3/1999 |
| JP | 11-147732 | | 6/1999 |
| JP | 2000-335933 | A | 12/2000 |
| JP | 2002-187733 | A | 7/2002 |
| JP | 2002-535238 | A | 10/2002 |
| JP | 2002-321936 | A | 11/2002 |
| JP | 2002-338289 | A | 11/2002 |
| JP | 2003-119045 | | 4/2003 |
| JP | 2003-167144 | | 6/2003 |

OTHER PUBLICATIONS

H. Murata, et al.: "Hydrogen Problems and Longterm Reliability of Fiber Cables"; Proceedings of the SPIE; vol. 584; 1986; pp. 53-60.

Russian Office Action, issued in corresponding Russian Patent Application No. 2006121128/03, dated Sep. 13, 2007.

Y. Namihira, et al., "Temperature dependence of the hydrogen-diffusion constant in optical fibers", Opt. Lett., vol. 9, No. 9 pp. 426-428, 1984.

J. Kirchhof et al., "Diffusion Processes in Lightguide Materials", Physical-Technological Institute, Sol. (a) 101, pp. 391-401, 1987.

Pawel Mergo, et al., "Method of calculations of loss dependence of Single mode optical fibers on diffusion of water", SPIE, 2000, ISSU 4239, pp. 37-43.

U.C. Peak, et al., "Physical behavior of the neck-down region during fumagegirawing of silica fibers", J. Appl. Phys. 48, No. 8, pp. 4417-4422, 1978 vol. 49.

Andrade, "A Theory of the Viscosity of Liquids", Phil. Mag., vol. 17, pp. 497-511,698-733, (1934).

* cited by examiner

FIG.7
— conventional —

DRAWING METHOD FOR BARE OPTICAL FIBER WITH SUPPRESSED HYDROGEN DIFFUSION

TECHNICAL FIELD

The present invention relates to a drawing method for a bare optical fiber, a manufacturing method for an optical fiber using the drawing method, and an optical fiber obtained using the manufacturing method for an optical fiber, and it particularly relates to a drawing method for a bare optical fiber for manufacturing optical fiber with a lower absorption loss due to OH groups, and a manufacturing method for an optical fiber using the drawing method, and an optical fiber obtained using the manufacturing method for an optical fiber.

The present application claims priority to Japanese Patent Application No. 2003-387746 filed on Nov. 18, 2003 and Japanese Patent Application No. 2004-279452 filed on Sep. 27, 2004, the details of which are incorporated herein.

BACKGROUND ART

Recently, optical fiber, which is applicable to coarse wavelength division multiplexing (hereafter, abbreviated as "CWDM") transmission, with a lower loss in the band of wavelength 1380 nm (absorption loss due to OH groups), has attracted attention.

The optical fiber with a lower absorption loss due to OH groups enables structuring an inexpensive CWDM transmission system; and in addition, the production cost is also substantially equal to that of typical single mode fiber. Consequently, the optical fiber has a great cost merit, so many companies proceed with research and development and products are commercialized.

When hydrogen diffuses into an optical fiber, it causes increased absorption loss due to OH groups, making so it necessary to prevent hydrogen penetration into the optical fiber. For drawing the bare optical fiber in the manufacturing of the optical fiber, a means to prevent hydrogen penetration into the bare optical fiber is provided.

Figure 7:
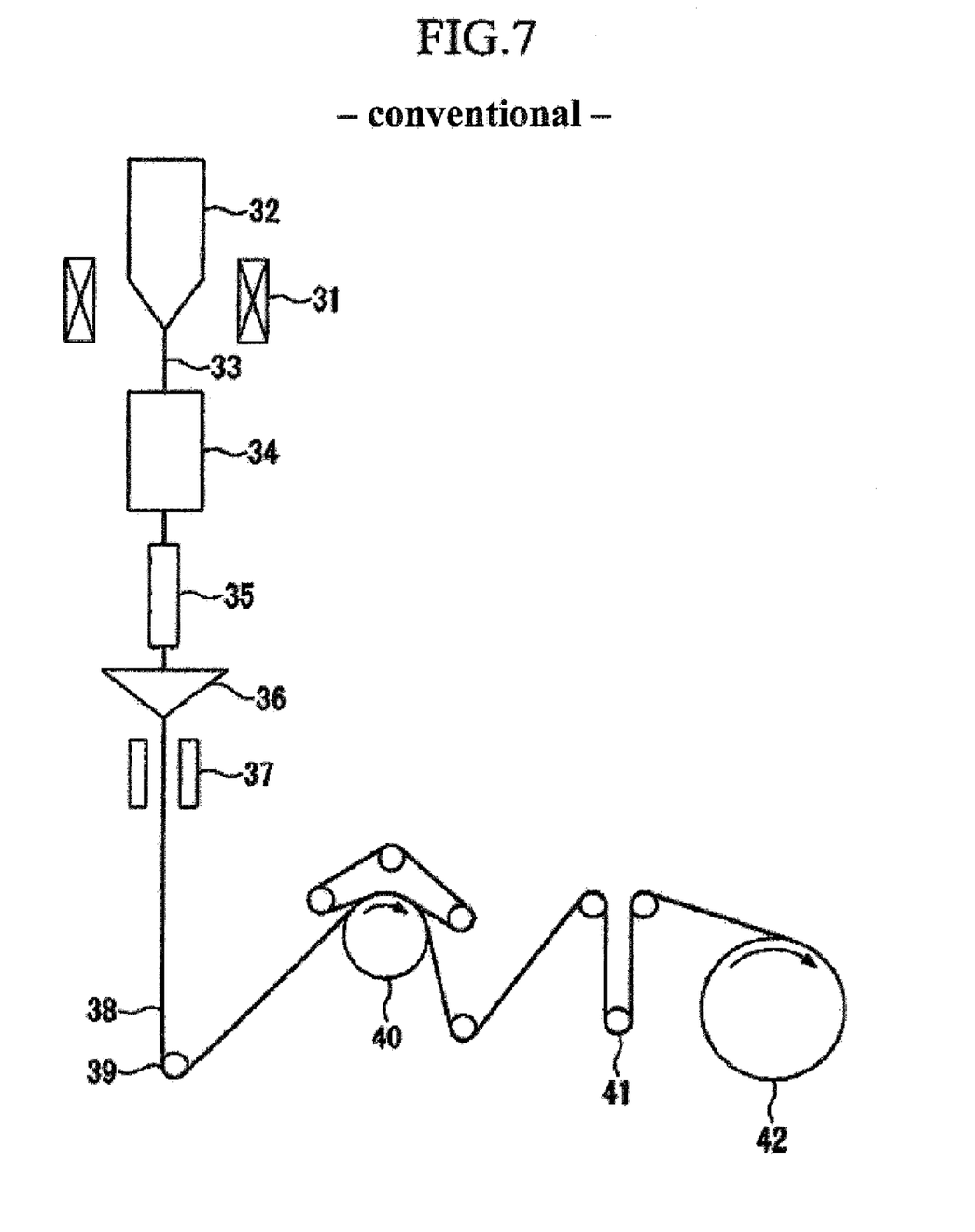
FIG. 7 is a schematic diagram showing a conventional manufacturing device for an optical fiber used for the conventional manufacturing method for an optical fiber.

FIG. 7 is a schematic diagram showing a manufacturing device for an optical fiber used in a conventional manufacturing method for an optical fiber.

In FIG. 7, a reference symbol 31 indicates a drawing furnace. An optical fiber preform 32 is mounted inside the drawing furnace 31 to be axially movable, and a lower end of the optical fiber preform 32 is drawn.

In the manufacturing of the optical fiber, first, optical fiber preform 32 containing as a main component silica-based glass is placed within the drawing furnace 31, and its end is heated to approximately 2000° C. at high temperature in an inert gas atmosphere, such as argon (Ar) or helium (He), and is drawn, thereby obtaining a bare optical fiber 33 with an external diameter of 125 μm.

Subsequently, the bare optical fiber 33 is sent to a mechanism to slowly cool the optical fiber, such as an annealing furnace 34 (hereafter, referred to as "annealing mechanism"), the cooling speed of the bare optical fiber 33 is changed and the optical fiber is slowly cooled.

The bare optical fiber 33 drawn out to the outside of the annealing furnace 34 is cooled to a temperature suitable to the formation of a coating layer for a next process. In the cooling process, it is naturally cooled in an atmosphere surrounding the bare optical fiber 34 or is forcibly cooled by supplying cooling gas, such as helium or nitrogen gas, using a cooling cylinder 35.

The bare optical fiber 33 cooled in the cooling process is coated with a coating layer made of ultraviolet ray curable resin, and which is made of a primary coating layer and a secondary coating layer, by a resin coating device 36 and a UV lamp 37 for the purpose of protecting the bare optical fiber 33, thereby obtaining an optical fiber 38 with an external diameter of 250 μm.

In addition, the optical fiber 38 is turned to another direction by a turning pulley 39, and is wound onto a winding drum 42 via a drawer 40 and a dancer roller 41.

Furthermore, a method for providing a coating layer onto the bare optical fiber 33 is not only a method where after a resin for the primary coating layer formation and a resin for the secondary coating layer are applied by a single resin applicator 36, the resins are cured by a single UV lamp 37, as shown in FIG. 7, but with a method where after a resin for primary coating layer formation and a resin for secondary coating layer are applied by two different resin applicators, the resins are cured by a single UV lamp, and another method where after a resin for primary coating layer formation is applied by a first resin applicator, the resin is cured by a first UV lamp, and after a resin for the secondary coating layer is applied by a second resin applicator, a resin cured by a second UV lamp can also be used.

In the conventional manufacturing method for an optical fiber, in order to reduce Rayleigh scattering and to reduce loss at a wavelength of 1550 nm (for example, refer to Patent Documents 1 to 3), or in order to control the increase in absorption loss caused by OH groups, it tends to slow the cooling speed and to cool the bare optical fiber 33 drawn out to the outside of the drawing furnace 31, by adjusting the drawing speed in a temperature region corresponding to the purpose, respectively, or by prolonging the annealing time.

As described above, when annealing is performed in the drawing the bare optical fiber 33, residual OH groups in the optical fiber preform 32 diffuse and hydrogen is thermally dissociated from the OH groups. In addition, diffusion of the dissociated hydrogen increases. Increased absorption loss due to the OH groups or the combination of a non-bridging oxygen hole center (hereafter, abbreviated as "NBOHC") in the optical fiber and hydrogen results in increased absorption loss due to the OH groups.

Means to resolve the problem are proposed, for example, in Patent Documents 4 to 6.

In Patent Document 4, an optical fiber preform having a substrate tube, a cladding layer inside the substrate tube and a core layer inside the cladding layer, and a barrier layer established between the substrate tube and the cladding layer, and a manufacturing method for an optical fiber using the optical fiber preform are proposed. The barrier layer is formed by depositing a substance with a low OH diffusion coefficient between the substrate tube and the cladding layer, and the penetration of the residual OH groups within the substrate tube to the cladding layer is prevented.

In Patent Document 5, a manufacturing method for an optical fiber is proposed where a first cladding with an external diameter "D" is deposited so as to surround a core with an external diameter "d" using a vapor-phase axial deposition method; a porous core rod satisfying a relational expression, $D/d \geq 4.0$, is formed; the porous core rod is dehydrated and the OH group concentration is reduced to 0.8 wtppb or less and vitrified to form a core rod; the transparent core rod is heated and elongated; a second core rod is deposited surrounding the core rod after elongating using the vapor-phase deposition method; the second clad is dehydrated so as to reduce the OH group concentration to 50 wtppm or less; it is vitrified to form an optical fiber preform; and after the optical fiber preform is drawn, it is maintained in a heavy hydrogen atmosphere for a pre-determined time.

In Patent Document 6, in a manufacturing method for an optical fiber where raw material gas is reacted and a glass fine particle aggregate is obtained, and the glass fine particle aggregate is sintered to vitrify it, a method via a first heating process to pre-dehydrate the glass fine particle aggregate and next, a second heating process to increase the temperature to a vitrification temperature, within the temperature range of 950 to 1,250° C. where the glass fine particle aggregate is not remarkably contracted, substantially in the oxygen gas atmosphere containing 1 mol % to 20 mol % of chlorine or chlorine compound, is proposed.

The manufacturing methods for optical fibers proposed in Patent Documents 4 to 6 have a problem where an absorption loss due to OH groups increases depending upon drawing conditions for the optical fiber. Further, there is another problem where a production cost increases.

Patent Document 1: Japanese Unexamined Patent Application, First Publication No. 2002-338289

Patent Document 2: Japanese Unexamined Patent Application, First Publication No. 2002-321936

Patent Document 3: Japanese Unexamined Patent Application, First Publication No. 2000-335933

Patent Document 4: Japanese Unexamined Patent Application, First Publication No. 2002-535238

Patent Document 5: Japanese Unexamined Patent Application, First Publication No. 2002-187733

Patent Document 6: Japanese Patent No. 2,549,615

DISCLOSURE OF INVENTION

Problems to be Solved by the Invention

The present invention has considers the above-described circumstances, and has an object of providing a drawing method for a bare optical fiber where production cost is reduced and a loss at the 1380 nm wavelength band is low, a manufacturing method for an optical fiber using the method, and an optical fiber obtained using the manufacturing method for an optical fiber.

Means for Solving the Problem

In order to resolve the problem, the present invention provides a drawing method for a bare optical fiber, comprising the steps of: melting an optical fiber preform using a heating device and drawing the bare optical fiber; and naturally cooling down the bare optical fiber or forcibly cooling down the bare optical fiber by a cooling device after the heating and melting step, wherein a temperature history during the drawing the optical fiber preform to obtain the bare optical fiber in the heating device satisfies a relational expression: $T \leq -0.01X+12$ where a time period when the heated and molten portion of the optical fiber preform heated and molten by the heating device reaches 1800° C. or higher is T (min) and a OH group concentration in a cladding layer of the optical fiber preform is X (wtppm).

In the drawing method for a bare optical fiber, when the OH group concentration in the cladding layer of the optical fiber preform before the heating and fusing step is X (wtppm) and a thermal dissociation coefficient from the OH groups during drawing is Y (wt %), it is preferable to satisfy a relational expression, $Y \leq -8 \times 10^{-5}X+0.06$. The present invention provides a manufacturing method for an optical fiber, comprising the steps of: melting an optical fiber preform using a heating device and drawing the bare optical fiber; naturally cooling down the bare optical fiber or forcibly cooling down by a cooling device after the heating and melting step; applying a coating material around the circumference of the bare optical fiber cooled to a pre-determined temperature in the cooling step; and curing the coating material and to obtain the optical fiber.

It is preferable that the cooling step comprises the steps of accelerating a cooling speed of the bare optical fiber to 6000° C./sec or faster until the external diameter of the bare optical fiber becomes constant after the bare optical fiber during drawing becomes less than 1800° C.

It is preferable that the cooling step comprises the step of accelerating the cooling speed of the bare optical fiber faster than that by air after the external diameter of the bare optical fiber during drawing becomes constant.

The present invention provides an optical fiber manufactured using the above manufacturing method for an optical fiber.

It is preferable for the optical fiber with the composition in which the loss at a wavelength of 1383 nm is 0.31 dB/km or less.

ADVANTAGEOUS EFFECT OF THE INVENTION

With the manufacturing method for an optical fiber of the present invention, an optical fiber with a lower loss at a wavelength band of 1380 nm can be obtained without dehydrating the cladding layer of the optical fiber preform. Therefore, the manufacturing process can be reduced. Concurrently, manufacturing time and manufacturing cost can be reduced.

Further, even in the case in which dehydration is performed, a hydrogen amount to be generated due to the heat-free from the residual OH groups can be reduced by adjusting the OH group concentration in the residual cladding layer according to the degree of the dehydration and variation in the concentration of residual OH groups due to manufacturing variation. In addition, the diffusion of the generated hydrogen can be lessened, so a loss at the 1380 nm wavelength band can be adjusted, enabling improved yield. As a result, manufacturing costs can be reduced.

DESCRIPTION OF REFERENCE SYMBOLS

1 . . . drawing furnace, 2 . . . optical fiber preform, 3 . . . bare optical fiber, 4 . . . annealing furnace, 5 . . . cooling cylinder, 6 . . . resin coating device, 7 . . . UV lamp, 8 . . . optical fiber, 9 . . . turning pulley, 10 . . . drawer, 11 . . . dancer roller, 12 . . . winding drum

DETAILED DESCRIPTION OF THE PREFERRED EMBODIMENTS

The manufacturing method for an optical fiber embodying the present invention is described hereafter, with reference to the drawings. As a cause to increase loss in the 1380 nm wavelength band of the optical fiber, diffusion of residual OH groups in an optical fiber preform, diffusion of hydrogen generated from OH groups due to thermal dissociation, and a difference between a recombination rate of NBOHC and a binding rate of hydrogen and NBOHC per temperature can be cited.

First, in order to examine the cause of an increase in the loss in the 1380 nm wavelength band of the optical fiber, the following two relationships were examined:

(1) The relationship between the OH group concentration distribution at a relative position from the center of an optical fiber preform and the OH group concentration distribution at a relative position from the center of a bare optical fiber obtained by drawing the optical fiber preform; and (2) The relationship between the concentration distribution of hydrogen generated from OH groups due to thermal dissociation at a relative position from the center of an optical fiber preform and the concentration distribution of hydrogen generated from OH groups due to thermal dissociation at a relative position from the center of a bare optical fiber obtained by drawing the optical fiber preform.

Figure 1:
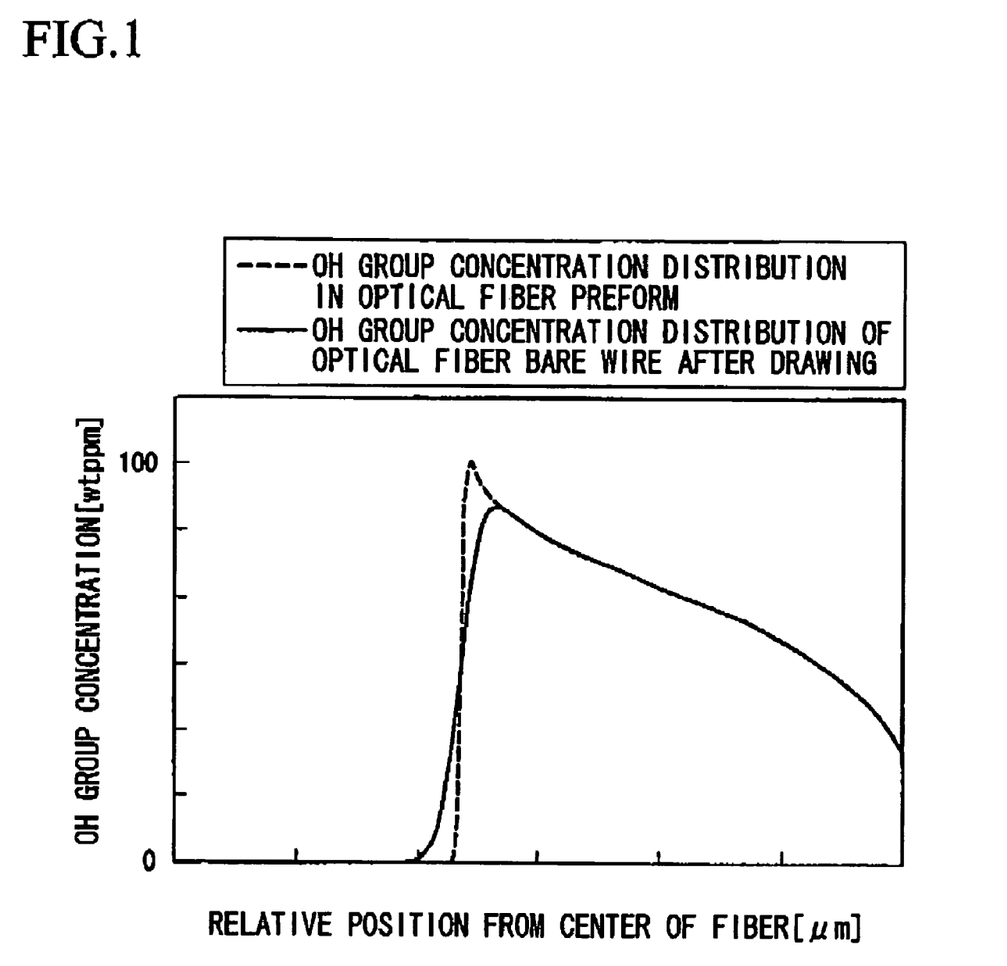
FIG. 1 is a diagram showing OH group concentration distribution at a relative position from the center of an optical fiber preform and an OH group concentration distribution at a relative position from the center of a bare optical fiber obtained by drawing an optical fiber preform.

FIG. 1 is a graph showing the OH concentration distribution at a relative position from center of the optical fiber preform and the OH concentration distribution at a relative position from the center of the bare optical fiber obtained by fusion drawing the optical fiber preform.

Figure 2:
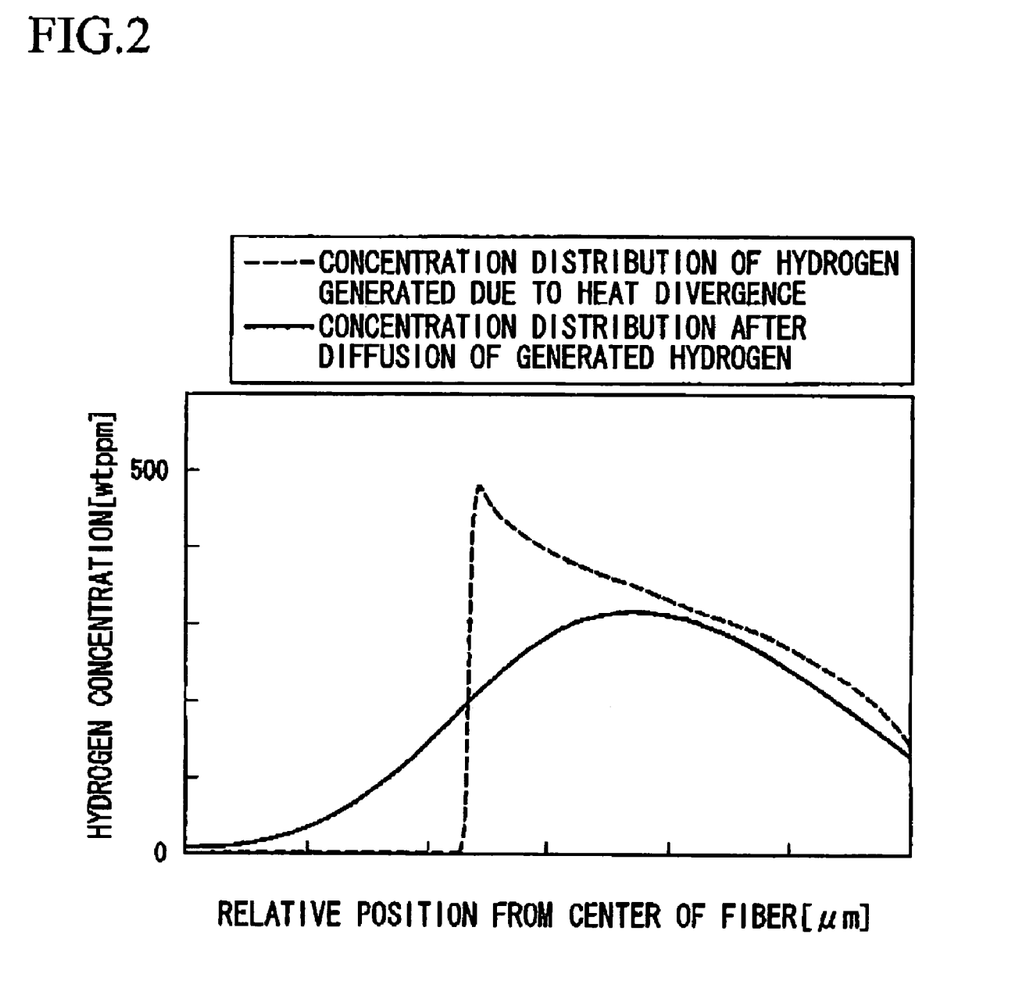
FIG. 2 is a graph showing the concentration distribution of hydrogen generated from OH groups due to thermal dissociation at a relative position from the center of an optical fiber preform and a concentration distribution of hydrogen generated from OH groups due to thermal dissociation at a relative position from the center of a bare optical fiber obtained by drawing the optical fiber preform.

FIG. 2 is a graph showing the concentration distribution of hydrogen generated from OH groups due to thermal dissociation at a relative position from the center of the optical fiber preform and the concentration distribution of hydrogen generated from OH groups due to thermal dissociation at a relative position from the center of the bare optical fiber obtained by drawing the optical fiber preform.

Comparing the optical fiber preform and the bare optical fiber according to FIG. 1, there is no great change in the OH group concentration distribution at the relative position from the center, respectively. In other words, although drawing of the bare optical fiber causes diffusion of OH groups, its effect on the transmission loss is small.

When the optical fiber preform and the bare optical fiber is compared according to FIG. 2, the concentration distributions of hydrogen generated due to OH groups at the relative position from the respective center greatly changed. In other words, drawing of the bare optical fiber causes the significant diffusion of hydrogen generated from OH groups due to thermal dissociation.

As described above, the increase of the loss in the 1380 nm wavelength band of the optical fiber is greatly affected by the diffusion of hydrogen generated from OH groups due to thermal dissociation more than by the diffusion of residual OH groups in the optical fiber preform, because a diffusion coefficient of hydrogen (see Y. Namihira, K. Mochizuki and K. Kuwazuru, "Temperature dependence of the hydrogen-diffusion constant in optical fibers", Opt. Lett., Vol. 9, No. 9, pp. 426-428, 1984) is greater than a diffusion coefficient of OH groups (see J. Kirchhof et al., "Diffusion Processes in Lightguide Materials", Phys. Stat. Sol. (1) 101, 391, 1987) by approximately 3 to 4 digits.

The higher the temperature of the bare optical fiber during drawing, the greater the percentage K (wt %) of thermally-dissociated hydrogen from OH groups in the state of equilibrium at a specified temperature T (K) becomes. In addition, the temperature of the bare optical fiber during drawing varies according to the temperature distribution in a drawing furnace, the type of inert gas flowing into the drawing furnace, the cooling method for a bare optical fiber in the annealing furnace and the cooling cylinder, and the drawing condition, such as a drawing speed of the bare optical fiber. Therefore, since the percentage K (wt %) of thermally-dissociated hydrogen from OH groups changes according to the drawing conditions, the total percentage K (wt %) of thermally-dissociated hydrogen from OH groups, from the start to the completion of drawing of the bare optical fiber (hereafter, referred to as "thermal dissociation coefficient of hydrogen"), also changes according to the drawing conditions.

The "thermal dissociation coefficient of hydrogen" means an accumulated percentage of thermally-dissociated hydrogen from the time of heating the optical fiber preform, followed by when a coating layer is formed around the circumference of the bare optical fiber and the optical fiber is manufactured, and the drawing process of the bare optical fiber until the temperature of the optical fiber becomes room temperature.

Figure 3:
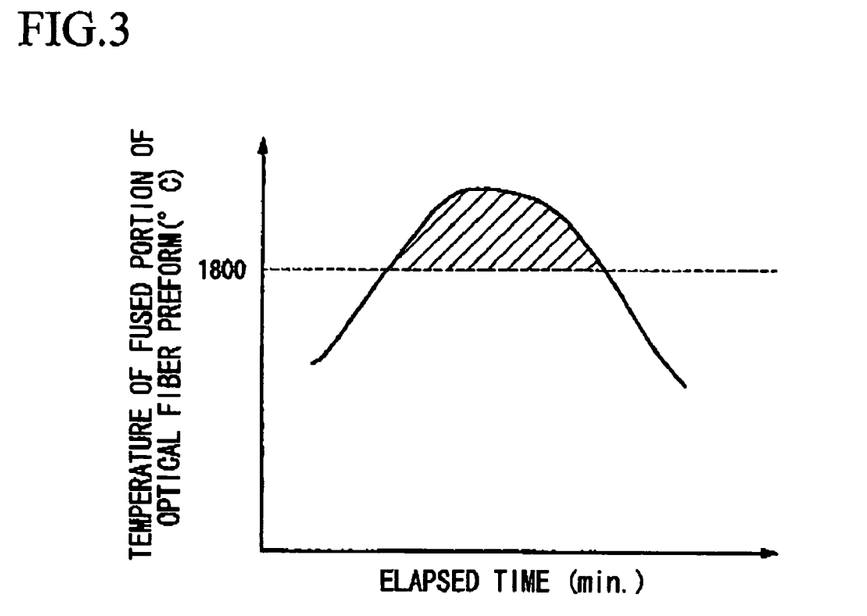
FIG. 3 is a graph showing the temperature change of a molten portion of an optical fiber preform.

As described above, the percentage of thermally-dissociated hydrogen has temperature dependency, so the higher the temperature, the greater the rate becomes. However, since the percentage of thermally-dissociated hydrogen has very great temperature dependency, it can approximate the rate of hydrogen dissociated during the time when a molten portion of the optical fiber preform reaches 1800° C. or higher (a shaded region in FIG. 3).

The thermal dissociation coefficient of hydrogen is calculated as follows: First, a Fourier type infrared spectrometer (microscopic FTIR device) is used by using a portion of the optical fiber preform, and the concentration distribution of residual OH groups in the optical fiber preform is calculated from an absorption peak due to stretching vibration of OH groups.

Next, an optical fiber is manufactured by drawing the optical fiber preform under pre-determined drawing conditions, and the attenuation spectra of the optical fiber are measured using a cutback method. The measurement of the attenuation spectra results in the obtainment of a attenuation spectra of the optical fiber as shown in FIG. 4 (solid line indicated in FIG. 4).

Figure 4:
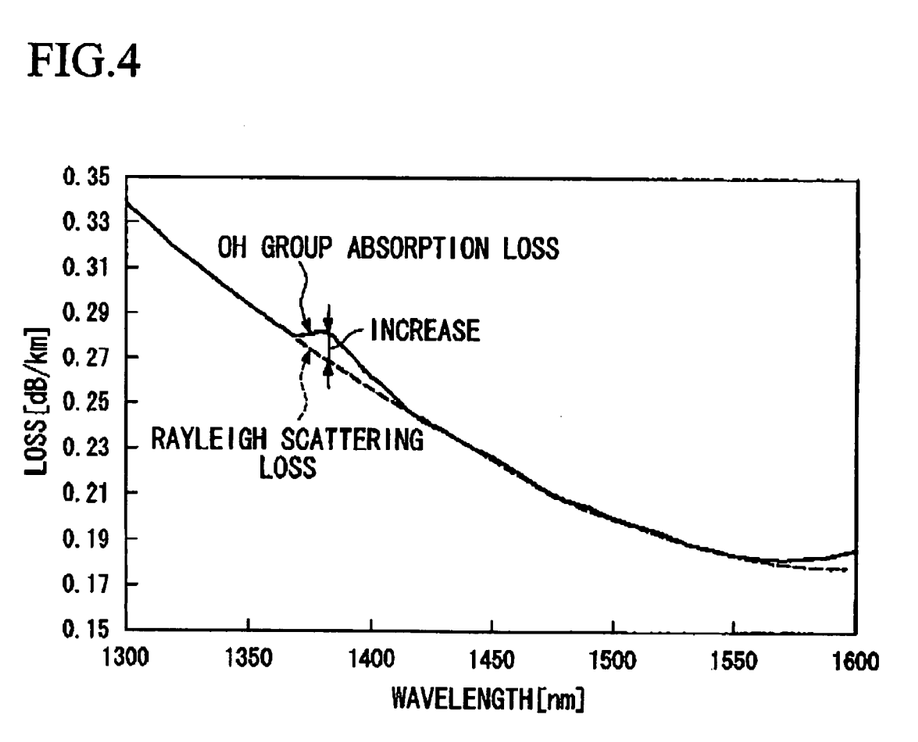
FIG. 4 is a graph showing the wavelength loss characteristics of an optical fiber.

The attenuation spectra of the optical fiber (broken line shown in FIG. 4) attributable to the Rayleigh scattering is calculated from the attenuation spectra of the optical fiber shown in FIG. 4. The difference of the loss of the optical fiber attributable to the Rayleigh scattering with respect to the loss of the optical fiber at a wavelength of 1383 nm is equivalent to the absorption loss due to OH groups generated by diffusing hydrogen generated from OH groups due to thermal dissociation and by binding with NBOHC.

The concentration distribution of residual OH groups in the optical fiber preform is multiplied by the thermal dissociation coefficient of hydrogen to obtain the hydrogen concentration distribution in the optical fiber preform (for example, the concentration distribution of hydrogen generated due to the heat-free shown in FIG. 2). Next, the hydrogen concentration distribution (for example, the concentration distribution after diffusion of generated hydrogen shown in FIG. 2) after diffusing into the bare optical fiber by drawing the optical fiber preform is calculated using the diffusion coefficient of hydrogen, by taking the external diameter change and the temperature change in the bare optical fiber during drawing into consideration.

In calculating the hydrogen concentration distribution after diffusing into the bare optical fiber, as a diffusion equation, the Green function is used (Tsutomu IMAI, "Physics and Green Function", Iwanami Shoten Publishers, Jun. 27, 1978, pp. 51-53).

In general, when a position vector is "r", the OH group concentration distribution in a cladding layer of the optical fiber preform before drawing is u(r, 0), and the Green function of the diffusion equation is G(r, r', t); the OH group concentration distribution u(r, t) can be expressed with the following expression (1):

Formula 1

$$u(r, t) = \frac{1}{D} \int G(r, r', t) u(r', 0) dr' \quad (1)$$

In this instance, when the diffusion coefficient is "D", the n-dimensional Green function is expressed with the following expression (2):

Formula 2

$$G(r, r', t) = D\theta(t) \left(\frac{1}{4\pi Dt}\right)^{\frac{n}{2}} \exp\left(\frac{r^2}{4Dt}\right) \quad (2)$$

Figure 5:
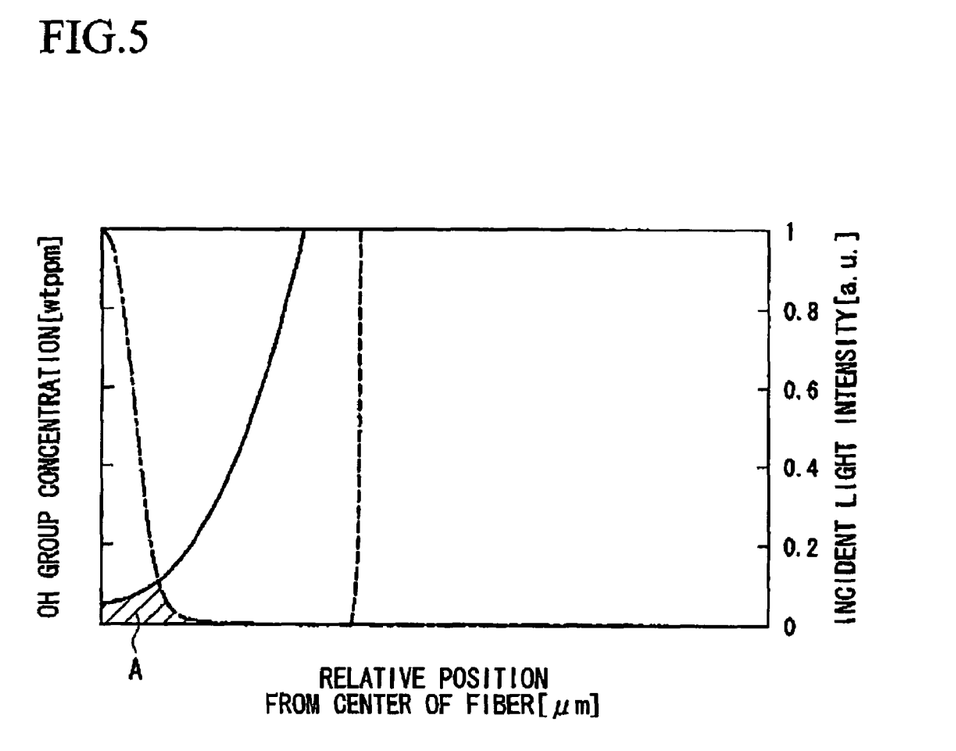
FIG. 5 is a graph showing the concentration distribution of hydrogen generated from OH groups due to thermal dissociation at a relative position from the center of an optical fiber preform, and a concentration distribution of hydrogen generated from OH groups due to thermal dissociation at a relative position from the center of a bare optical fiber obtained by drawing the optical fiber preform, and a region affecting loss at a wavelength of 1383 nm according to the relationship with the intensity of an incident light.

Next, the thermal dissociation coefficient of hydrogen is calculated using the conversion expression of absorption loss due to OH groups (see Pawel Mergo, Witold Spytek, "Method for calculations of loss dependence of single-mode optical fiber on diffusion of water," Proceedings—SPIE (the International Society for Optical Engineering), 2000, ISSU 4239, pp. 37-43) so as to equalize absorption loss due to OH groups calculated using it and the absorption loss due to OH groups obtained from a loss of the optical fiber attributable to the Rayleigh scattering (see FIG. 5).

In FIG. 5, the broken line indicates the concentration distribution of hydrogen generated due to residual OH groups in the optical fiber preform; the solid line indicates another concentration distribution where an OH group concentration distribution, where OH groups have diffused into the bare optical fiber as they are, is added to another OH group concentration distribution, where hydrogen diffused into the bare optical fiber has been bound with NBOHC and become an OH group; and the dashed line indicates a light intensity distribution when a light enters into the optical fiber. Further, the region (shaded portion A in FIG. 5) surrounded by the solid line, the dashed line, the vertical axis, and the horizontal axis is a region affecting the loss in the 1380 nm wavelength band.

In this instance, in a precise sense, the thermal dissociation coefficient of hydrogen is calculated by taking (A) the thermal dissociation coefficient of hydrogen is greatly dependent on the temperature, and (B) the OH group concentration decreases due to the heat-free of hydrogen from OH groups, into consideration.

In this instance, because (a) the percentage of thermally-dissociated hydrogen has great temperature dependency, and it is presumed that the thermally-dissociated hydrogen is mostly generated at 1800° C. or higher, and (b) the percentage of thermally-dissociated hydrogen is sufficiently small, the above-mentioned (A) and (B) will not be taken into consideration, but it is assumed that hydrogen equivalent to the thermal dissociation coefficient from the OH groups contained in the optical fiber preform before drawing the bare optical fiber is generated. In addition, considering the change of the external diameter and the temperature change at the time of drawing the bare optical fiber, an approximation is made by assuming hydrogen diffusion.

Next, the time period T (min) when the heated and molten portion of the optical fiber preform has reached a specified temperature or higher is calculated as follows: In general, for the relationship between glass viscosity η and drawing tension F, the following expression (3) is realized according to a balance of forces during drawing (see U. C. Peak and R. B. Runk, "Physical behavior of the neck-down during furnace of drawing of silica fibers," J. Appl. Phys., vol. 49, No. 8, pp. 4417-4422, 1978):

Formula 3

$$F = 3\eta S \frac{\partial V}{\partial z} \quad (3)$$

In this instance, the reference symbol V indicates a drawing speed, z indicates a drawing direction position, and S indicates a fiber cross-sectional area.

Further, the relationship between the viscosity η and the temperature $T_o$ is also common, and the following relational expression (4) is realized (see Andrade, EN da C., Phil. Mag., Vol. 17, 497, 698, 1934):

Formula 4

$$\log_{10}\{\eta(T)\} = -6.37 + 2.32 \times 10^4 / T_0 \quad (4)$$

As described above, the calculation of the viscosity from glass deformation configuration (neck-down configuration) and the drawing tension, and the conversion from the viscosity to the temperature enable the calculation of the temperature from the neck-down configuration.

Similarly, drawing elapsed time "dt" can be calculated from the neck-down external diameter according to the following expression (5):

Formula 5

$$dt = \frac{\partial z}{\partial V} \quad (5)$$

Therefore, regarding the time period T when the heated and molten portion of the fiber preform reaches 1800° C. or higher, the segment from z1 to z2 where the temperature is 1800° C. or higher can be estimated from the expressions (3) and (4), and the time required for the segment can be calculated from the following expression (6) using the expression (5):

Formula 6

$$T = \int_{z1}^{z2} dt \quad (6)$$

Considering the above, a manufacturing method for an optical fiber to reduce the thermal dissociation coefficient of hydrogen is described as follows.

Figure 6:
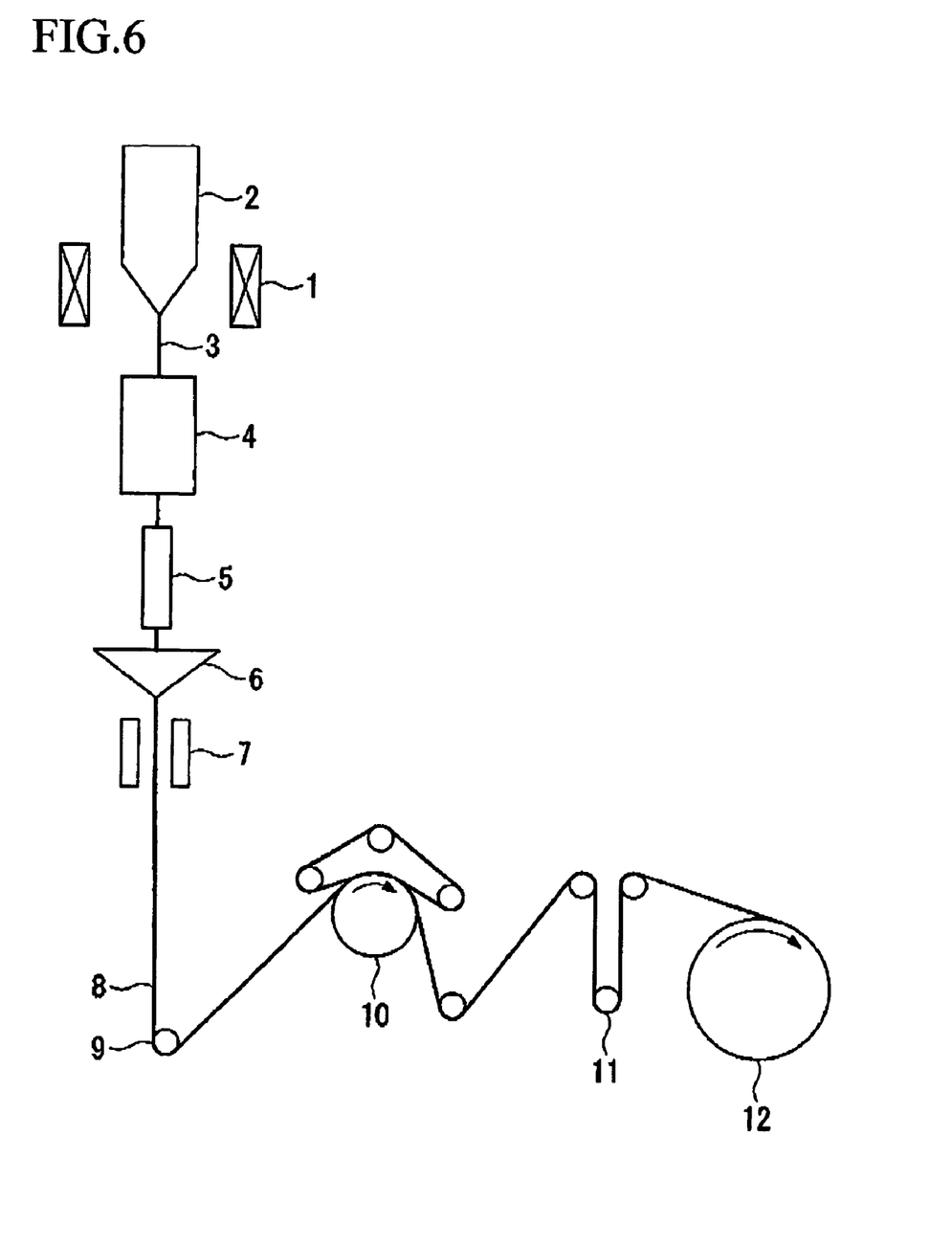
FIG. 6 is a schematic diagram showing a manufacturing device for an optical fiber used for the present invention.

FIG. 6 is a schematic diagram showing the manufacturing device for the optical fiber used in the present invention.

In FIG. 6, the reference symbol 1 indicates a drawing furnace. An optical fiber preform 2 is mounted inside the drawing furnace 1 to be axially movable, and the lower end of the optical fiber preform 2 is drawn.

In the manufacturing of the optical fiber, first, the optical fiber preform 2 made primarily of silica-based glass is placed within the drawing furnace 1, and its end is heated to 2000° C. at high temperature in the inert gas atmosphere, such as argon or helium, and is drawn, and then, a bare optical fiber 3 with an external diameter of 125 μm is obtained. At this time, heater length and a heat insulating material to be used in the drawing furnace 1 are appropriately selected, and are adjusted to be the desirable time period T (min) under the drawing conditions.

Subsequently, the bare optical fiber 3 is sent to an annealing mechanism, such as an annealing furnace 4, and cooling speed of the bare optical fiber 3 is changed and the bare optical fiber 3 is slowly cooled.

The bare optical fiber 3 drawn out to outside of the annealing furnace 4 is cooled to a preferable temperature for formation of a coating layer for the next process by adjusting the cooling speed. In the cooling process, the bare optical fiber is naturally cooled by the atmosphere surrounding the bare optical fiber or forcibly cooled by supplying cooling gas, such as helium or nitrogen gas, using a cooling cylinder 5.

The bare optical fiber 3 cooled in the cooling process is coated by a coating layer, which is made of an ultraviolet ray curable resin, and which is made of a primary coating layer and a secondary coating layer, by a resin applicator 6 and a UV lamp 7, and an optical fiber 8 with an external diameter of 250 μm is obtained.

In addition, the optical fiber 8 is turned to another direction by a turning pulley 9, and is wound onto a winding drum 12 via a drawer 10 and a dancer roller 11.

Furthermore, in the embodiment, a method to place the coating layer onto the bare optical fiber 3 is, as shown in FIG. 6, a method where after a resin for a primary coating layer formation and a resin for a secondary coating layer formation are applied by one resin applicator 6, these resins are cured by one UV lamp 7. However, the present invention is not limited to this method. In the present invention, a method where after the resin for a primary coating layer formation and the resin for a secondary coating layer formation are applied by two different resin applicators, respectively, the resins are cured by one UV lamp; or another method where after the resin for a primary coating layer formation is applied by a first resin applicator, the resin is cured by a first UV lamp, and next, after the resin for a secondary coating layer formation is applied by a second resin applicator, the resin is cured by a second UV lamp can also be used.

The manufacturing method for an optical fiber of the present invention is a method to reduce a thermal dissociation coefficient of hydrogen from OH groups in a cladding layer of the bare optical fiber 3 during drawing and to lessen diffusion. Consequently, for the temperature history on the occasion that the lower end of the optical fiber preform 2 (hereafter, referred to as "molten portion") is drawn in the drawing furnace 1, it is desirable to satisfy a relational expression: $T \leq -0.01X+12$, when the time period when the heated and molten portion of the optical fiber preform 2 has reached a temperature of 1800° C. or higher is T (min) and the OH group concentration in the cladding layer of the lower end of the optical fiber preform 2 is X (wtppm). However, when dehydration is performed and the residual OH group concentration in the cladding layer is 0.0 (wtppm), since there is no OH group to be dissociated, the rate of thermal dissociation is set at 0.0 (wtppm). Therefore, when X=0.0 (wtppm), the relational expression ($T \leq -0.01X+12$) does not have to be satisfied.

In order to manufacture the optical fiber to satisfy the relational expression, the speed of drawing (drawing speed) is accelerated, or a region to melt the optical fiber preform 2 is established to be shorter.

In order to satisfy the relational expression, it is desirable that the thermal dissociation coefficient satisfies the relational expression, $Y \leq -8 \times 10^{-5}X+0.06$, when the OH group concentration in the cladding layer at the lower end of the optical fiber preform 2 is X (wtppm) and the thermal dissociation coefficient of hydrogen from the OH group is Y (wt %).

In the drawing furnace 1, as an element to add heat to the lower end of the optical fiber preform 2, convective heat transfer from inner gas flowing into the drawing furnace 1 and conductive heat transfer to transmit heat to the optical fiber preform 2 can be cited in addition to radiation heat transfer by a heater provided at the drawing furnace 1. The effect by the radiation heat transfer is dominant at high temperature, approximately 1800° C. However, the lower the temperature, the greater the convective heat transfer by the inert gas. Consequently, in the manufacturing method for an optical fiber of the present invention, it is desirable to promptly deprive heat added to the optical fiber preform 2 due to the radiation heat transfer by a heater and to reduce the temperature. Therefore, it is desirable to use inert gas with a high convective heat transfer coefficient, and particularly desirable to use helium (He), which has a high convective heat transfer coefficient.

As described above, the bare optical fiber 3 drawn out to the outside of the drawing furnace 1 is cooled by sequentially sending to the annealing furnace 3 and the cooling cylinder 5. The cooling of the bare optical fiber 3 is designed to control the diffusion of hydrogen generated from OH groups due to thermal dissociation, and it is preferable to maintain the cooling speed of the bare optical fiber 3 during drawing at 6000° C./sec or faster from the time when the temperature of the bare optical fiber 3 during drawing becomes lower than 1800° C. until the external diameter becomes definite (in general, an external diameter of 125 μm), and it is desirable to maintain the cooling speed at approximately 8000° C./sec to 10000° C./sec. If the cooling speed of the bare optical fiber 3 during drawing is slower than 6000° C./sec, the diffusion of hydrogen generated from OH groups due to thermal dissociation increases, as a result of which the absorption loss due to the OH groups of the obtained optical fiber 10 increases.

In order to maintain the cooling speed of the bare optical fiber 3 during drawing at 6000° C./sec or faster, the temperature of the annealing furnace 4 may be reduced, the annealing mechanism, such as the annealing furnace 4, may not be used, or helium, which has a high convective heat transfer coefficient, is used as cooling gas in the annealing furnace 4.

Further, after the external diameter of the bare optical fiber 3 during drawing becomes to a certain value (in general, an external diameter of 125 μm), it is preferable to accelerate the cooling speed of the bare optical fiber 3 during drawing faster than by air. Specifically, it is preferable to maintain the cooling speed of the bare optical fiber 3 during drawing at approximately 6000° C./sec to 30000° C./sec. If the cooling speed of the bare optical fiber during drawing becomes faster than by air, the diffusion of hydrogen generated from OH groups due to thermal dissociation is reduced, and as a result, the obtained optical fiber will have a smaller absorption loss due to the OH groups.

If the cooling speed of the bare optical fiber 3 during drawing is maintained at that of by air or slower, the diffusion of hydrogen generated due to the heat-free from the OH groups increases. As a result, the absorption loss of the obtained optical fiber 10 due to the OH group increases.

In order to accelerate the cooling speed of the bare optical fiber 3 during drawing compared to that by air, helium, which has a high convective heat transfer coefficient, is used in the cooling cylinder 5 as cooling gas.

Furthermore, the faster the drawing speed, the shorter the time to receive the temperature history at the lower end of the optical fiber preform 2 within the drawing furnace 1. However, as long as a certain temperature history of the optical fiber preform 2 within the drawing furnace 1 is satisfied, the drawing speed is not limited. The drawing speed is appropriately established within the range of 600 m/min to 2500 m/min.

As described above, with the manufacturing method for an optical fiber, a stable coating material can be applied onto the appropriately cooled-down bare optical fiber. Sequentially, curing the coating material enables the obtainment of a desired optical fiber. The series of processing steps enable the obtainment of an optical fiber with a lower loss in the 1380 nm wavelength band as a result.

Since the optical fiber 10 manufactured using the manufacturing method for an optical fiber is manufactured by reducing the diffusion of hydrogen generated from OH groups due to thermal dissociation; as a result, an optical fiber with a lower absorption loss due to the OH groups can be obtained.

EXAMPLES

The present invention is more specifically described hereafter, according to the example. However, the present invention is not limited to the following examples.

Example 1

An optical fiber preform with an OH group concentration of approximately 100 wtppm in the cladding layer was prepared. The optical fiber preform was drawn under conditions where the drawing speed was 1500 m/min, the atmospheric gas at the lower portion of the drawing furnace was helium, the bare optical fiber drawn out to the outside of the drawing furnace was not slowly cooled by the annealing furnace before sending to the cooling cylinder, and the time period during which the during which temperature of the optical fiber preform reached 1800° C. or higher was for 5 min. Then, a primary coating layer and a secondary coating layer made of urethane acrylate-based ultraviolet ray curable resin were sequentially provided onto the bare optical fiber, and an optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Example 2

An optical fiber preform where the OH group concentration in the cladding layer was approximately 300 wtppm was prepared. The optical fiber preform was drawn under conditions where the drawing speed was 1200 m/min, the atmospheric gas at the lower side of the drawing furnace was argon, the bare optical fiber drawn out to the outside of the drawing furnace was not slowly cooled by the annealing furnace before sending to the cooling cylinder, and the time period during which the during which temperature of the optical fiber preform reached 1800° C. or higher was for 8 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated. The results are shown in Table 1.

Example 3

An optical fiber preform with an OH group concentration of approximately 500 wtppm in the cladding layer was prepared. The optical fiber preform was drawn under conditions where the drawing speed was 2000 m/min, the atmospheric gas at the lower side of the drawing furnace was helium, the bare optical fiber drawn out to the outside of the drawing furnace was slowly cooled by the annealing furnace before sending to the cooling cylinder, and the time period during which the during which temperature of the optical fiber preform reached 1800° C. or higher was for 5 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Reference Example

An optical fiber preform with an OH group concentration of approximately 0 wtppm in the cladding layer was prepared. The optical fiber preform was drawn under conditions where the drawing speed was 600 m/min, the atmospheric gas at the lower side of the drawing furnace was argon, the bare optical fiber drawn out to the outside of the drawing furnace was slowly cooled by the annealing furnace before sending to the cooling cylinder, and the time period during which the during which temperature of the optical fiber preform reached 1800° C. or higher was for 15 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Example 4

An optical fiber preform with an OH group concentration of approximately 100 wtppm in the cladding layer was prepared. The optical fiber preform was drawn under conditions where the drawing speed was 1500 m/min, the atmospheric gas at the lower side of the drawing furnace was helium, the bare optical fiber drawn out to the outside of the drawing furnace was slowly cooled by the annealing furnace before sending to the cooling cylinder, and the time period during which the during which temperature of the optical fiber preform reached 1800° C. or higher was for 5 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Comparative Example 2

An optical fiber preform with an OH group concentration of approximately 100 wtppm in the cladding layer was prepared. The optical fiber preform was drawn under conditions where the drawing speed was 600 m/min, the atmospheric gas at the lower side of the drawing furnace was argon, the bare optical fiber drawn out to the outside of the drawing furnace was slowly cooled by the annealing furnace before sending to the cooling cylinder, and the time period during which the during which temperature of the optical fiber preform reached 1800° C. or higher was for 15 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Comparative Example 3

An optical fiber preform with approximately 300 wtppm of OH group concentration in the cladding layer was prepared. The optical fiber preform was drawn under conditions where the drawing speed was 800 m/min, the atmospheric gas at the lower side of the drawing furnace was argon, the bare optical fiber drawn out to the outside of the drawing furnace was not slowly cooled by the annealing furnace before sending to the cooling cylinder, and the time period during which the during which temperature of the optical fiber preform reached 1800° C. or higher was for 10 min.

Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Comparative Example 4

An optical fiber preform with an OH group concentration of approximately 500 wtppm in the cladding layer was prepared. The optical fiber preform was drawn under conditions where the drawing speed was 1200 m/min, atmospheric gas at the lower side of the drawing furnace was helium, the bare optical fiber drawn out to the outside of the drawing furnace was not slowly cooled by the annealing furnace before sending to the cooling cylinder, and the time period during which the during which temperature of the optical fiber preform reached 1800° C. or higher was for 8 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

Comparative Example 5

An optical fiber preform with an OH group concentration of approximately 700 wtppm in the cladding layer was prepared. The optical fiber preform was drawn under conditions where the drawing speed was 1,000 m/min, the atmospheric gas at the lower side of the drawing furnace was helium, the bare optical fiber drawn out to the outside of the drawing furnace was slowly cooled by the annealing furnace before sending to the cooling cylinder, and the time period during which the during which temperature of the optical fiber preform reached 1800° C. or higher was for 10 min. Then, a primary coating layer and a secondary coating layer made of urethane acrylate-based ultraviolet ray curable resin were sequentially provided onto the bare optical fiber, and the optical fiber was produced.

For the obtained optical fiber, a loss at a wavelength of 1383 nm and an absorption loss due to OH groups were measured, and the thermal dissociation coefficient of hydrogen was calculated using these losses. The results are shown in Table 1.

TABLE 1

| | OH group concentration in cladding layer (wt ppm) | Time period during appropriate temp. ($\geq 1800°$ C.) (min) | Atom. gas at lower side of drawing furnace | Cooling method | Drawing speed (m/min) | Loss at 1383 nm (dB/km) | Absorption loss due to OH groups (dB/km) | accumulated percentage of thermally-dissociated hydrogen (wt %) | $T \leq -0.01X + 12$ (min) | $Y \leq -8 \times 10^{-5}X + 0.06$ (wt %) |
|---|---|---|---|---|---|---|---|---|---|---|
| Ex. 1 | ≈100 | 5 | He | No annealing | 1500 | 0.271 | 0.011 | 0.02 | 11 | 0.052 |
| Ex. 2 | ≈300 | 8 | Ar | No annealing | 1200 | 0.293 | 0.033 | 0.03 | 9 | 0.036 |
| Ex. 3 | ≈500 | 5 | He | Annealing | 2000 | 0.279 | 0.019 | 0.02 | 7 | 0.020 |
| Reference Ex. | ≈0 | 15 | Ar | Annealing | 600 | 0.265 | 0.005 | 0 | 12 | 0.060 |
| Ex. 4 | ≈100 | 5 | He | Annealing | 1500 | 0.285 | 0.025 | 0.02 | 11 | 0.052 |
| Comp. Ex. 2 | ≈100 | 15 | Ar | Annealing | 600 | 0.320 | 0.060 | 0.08 | 11 | 0.052 |

TABLE 1-continued

|  | OH group concentration in cladding layer (wt ppm) | Time period during appropriate temp. ($\geq$1800° C.) (min) | Atom. gas at lower side of drawing furnace | Cooling method | Drawing speed (m/min) | Loss at 1383 nm (dB/km) | Absorption loss due to OH groups (dB/km) | accumulated percentage of thermally-dissociated hydrogen (wt %) | $T \leq -0.01X + 12$ (min) | $Y \leq -8 \times 10^{-5}X + 0.06$ (wt %) |
|---|---|---|---|---|---|---|---|---|---|---|
| Comp. Ex. 3 | ≈300 | 10 | Ar | No annealing | 800 | 0.315 | 0.055 | 0.05 | 9 | 0.036 |
| Comp. Ex. 4 | ≈500 | 8 | He | No annealing | 1200 | 0.332 | 0.072 | 0.05 | 7 | 0.020 |
| Comp. Ex. 5 | ≈700 | 10 | He | Annealing | 1000 | 0.450 | 0.190 | 0.05 | 5 | 0.004 |

According to the results in Table 1, in Examples 1 to 4, when the concentration of the residual OH groups in the cladding layer of the optical fiber preform before drawing is X (wtppm), if the time period T (min) when the lower end of the optical fiber preform reaches 1800° C. or higher of temperature satisfies the relational expression: $T \leq -0.01X+12$, the loss at a wavelength of 1383 nm could be reduced to 0.31 dB/km or lower. In addition, as shown in the Reference Example, when X=0.0 (wtppm), T did not have to satisfy the relational expression since no hydrogen is generated due to the thermal dissociation. Further, the thermal dissociation coefficient Y (wt %) of hydrogen from OH groups in the cladding layer of the bare optical fiber during wire drawing also satisfied the relational expression, $Y \leq -8 \times 10^{-5}X+0.06$, and the loss at a wavelength of 1383 nm could be reduced to 0.31 dB/km or lower.

Comparing Example 1 and Example 4, a point where the bare optical fiber drawn out to the outside of the drawing furnace was not slowly cooled in Example 1, but the bare optical fiber drawn out to the outside of the drawing furnace in Example 4 was slowly cooled is different. It was confirmed that Example 4 satisfied the relational expression similar to Examples 1 to 3 and the loss at a wavelength of 1383 nm could be reduced to 0.31 dB/km or lower. However, it was confirmed that an optical fiber with a lower loss could be obtained in Example 1 where the bare optical fiber is not slowly cooled. According to the results, appropriate selection of a desirable annealing condition according to the concentration of residual OH groups enables the adjustment of the loss at a wavelength of 1383 nm.

Comparative Examples 2 to 5 did not satisfy the relational expression similar to those of Examples 1 to 4, and it was confirmed that the loss at a wavelength of 1383 nm exceeded 0.31 dB/km, and the lower loss could not be achieved.

INDUSTRIAL APPLICABILITY

The manufacturing method for an optical fiber of the present invention is applicable to an optical fiber preform produced using any methods, such as a vapor-phase axial deposition method (VAD method), an outside vapor phase oxidation method (OVD method), inside vapor phase deposition methods (CVD method, MCVD method and PCVD method) and a rod-in-tube method, as well. Further, the manufacturing method for an optical fiber of the present invention is applicable to any type of optical fiber, such as single mode fiber, dispersion shift fiber, cut-off shift fiber, or dispersion compensating fiber, as well.

The invention claimed is:

1. A drawing method for a silica-based bare optical fiber, the method comprising the steps of:
   melting a silica-based optical fiber preform using a heating device,
   drawing a heated and molten portion of the optical fiber preform to obtain a bare optical fiber; and
   cooling the bare optical fiber,
   wherein during the drawing step, in order to suppress a diffusion of hydrogen generated from an OH group due to thermal dissociation of the OH group, the temperature of the heated and molten portion of the optical fiber preform cannot exceed 1800° C. for longer than a time period T (min) defined by the relational expression $T=-0.01X+12$, where X (wtppm) is the OH group concentration in a cladding layer of the optical fiber preform, and
   the OH group concentration in the cladding layer is in the range of 100 to 500 wtppm.

2. The drawing method for a silica-based bare optical fiber according to claim 1,
   wherein the heated and molten portion of the fiber preform during the drawing step must satisfy a relational expression, $Y \leq -8 \times 10^{-5}X+0.06$, where a thermal dissociation coefficient of hydrogen from the OH groups during drawing during the heating and melting step is Y (wt %).

3. The drawing method for a silica-based bare optical fiber according to claim 1, further comprising the steps of:
   applying a coating material around the circumference of the bare optical fiber after the cooling step; and
   curing the coating material to obtain an optical fiber.

4. The drawing method for a silica-based bare optical fiber according to claim 1, wherein the cooling step comprises the step of cooling the bare optical fiber at 6000° C./sec or faster from a time the temperature of the bare optical fiber during drawing becomes lower than 1800° C. until an external diameter of the bare optical fiber becomes constant.

5. The drawing method for a silica-based bare optical fiber according to claim 1, wherein the cooling step comprises the step of forcibly cooling the bare optical fiber after an external diameter of the bare optical fiber during drawing becomes constant at a cooling speed that is faster than could be achieved by exposing the bare optical fiber to an ambient atmosphere.

6. The drawing method for a silica-based bare optical fiber according to claim 5 using a medium having a convective thermal conductivity, which is higher than that of air, as a cooling medium.

7. A drawing method for a silica-based bare optical fiber for reducing absorption loss due to OH groups comprising conducting the method of claim 1 to reduce absorption loss due to OH groups.

8. The drawing method for a silica-based bare optical fiber according to claim 1, wherein the drawing speed is any one selected from the range of 1200 to 2000 m/min.

* * * * *